(12) United States Patent
Ruml et al.

(10) Patent No.: US 6,898,475 B1
(45) Date of Patent: May 24, 2005

(54) SYSTEM AND METHOD UTILIZING TEMPORAL CONSTRAINTS TO COORDINATE MULTIPLE PLANNING SESSIONS

(75) Inventors: Wheeler Ruml, Palo Alto, CA (US); Markus P J. Fromherz, Palo Alto, CA (US)

(73) Assignee: Palo Alto Research Center Inc., Palo Alto, CA (US)

( * ) Notice: Subject to any disclaimer, the term of this patent is extended or adjusted under 35 U.S.C. 154(b) by 0 days.

(21) Appl. No.: 10/855,937

(22) Filed: May 27, 2004

(51) Int. Cl.[7] .............................................. G06F 19/00
(52) U.S. Cl. ...................... 700/103; 700/97; 700/100; 700/101; 700/102; 700/99
(58) Field of Search ...................... 700/99, 100, 101, 700/103; 714/1; 705/8

(56) References Cited

U.S. PATENT DOCUMENTS

| | | | | |
|---|---|---|---|---|
| 4,821,220 A | * | 4/1989 | Duisberg ........................ 703/2 |
| 4,965,743 A | * | 10/1990 | Malin et al. ................... 706/45 |
| 5,093,794 A | * | 3/1992 | Howie et al. ................ 700/100 |
| 5,586,021 A | * | 12/1996 | Fargher et al. .............. 700/100 |
| 5,604,600 A | * | 2/1997 | Webster ....................... 358/296 |
| 5,619,695 A | * | 4/1997 | Arbabi et al. ................ 718/100 |
| 5,671,338 A | * | 9/1997 | Araki et al. ................... 706/46 |
| 6,216,098 B1 | * | 4/2001 | Clancey et al. .................. 703/6 |
| 6,415,259 B1 | * | 7/2002 | Wolfinger et al. .............. 705/8 |
| 6,477,660 B1 | * | 11/2002 | Sohner ........................... 714/1 |
| 6,546,300 B1 | | 4/2003 | Fukuda et al. ............... 700/100 |
| 6,591,153 B2 | | 7/2003 | Crampton et al. ........... 700/103 |
| 6,606,527 B2 | | 8/2003 | De Andrade, Jr. et al. ... 700/97 |
| 6,606,529 B1 | | 8/2003 | Crowder, Jr. et al. ....... 700/100 |
| 2002/0138323 A1 | * | 9/2002 | Trautmann et al. ............ 705/8 |

OTHER PUBLICATIONS

"A Relational Model for the Representation of Mathematical Programming Models"—Choobineh, Department of Business Analysis and Research, Texas A&M University, 1992. IEEE.*

"Design Theory for Advanced Datamodels"–Schewe, Massey University, 2001, IEEE.*

"Data Integration by Describing Sources with Constraint Databases"–Cheng et al. UC Berkley, 1997, IEEE.*

U.S. Appl. No. 10/855,936 entitled "System and Method for Generative State–Space On–Line Planning", Wheeler Ruml et al., filed May 27, 2004.

U.S. Appl. No. 10/855,938 entitled "Exception Handling in Manufacturing Systems Combining On–Line Planning and Predetermined Rules", Wheeler Ruml et al., filed May 27, 2004.

Cervoni et al., "Managing Dynamic Temporal Constraint Networks", In Proceedings of AIPS–1994, pp. 13–18.

Dechter et al., "Temporal Constraint Networks", Artificial Intelligence 49, pp. 61–95.

* cited by examiner

*Primary Examiner*—Leo Picard
*Assistant Examiner*—Michael D. Masinick
(74) *Attorney, Agent, or Firm*—Linda M. Robb

(57) ABSTRACT

A method implemented in a computer control system utilizes temporal constraints to coordinate multiple planning sessions for multi-step production processes such that scheduling constraints are satisfied and flexibility for individual job planning is retained. The computer control system includes an outer planner loop module, which manages the queue of planned and unplanned jobs and interacts with the computer control system, and an individual job planner. The method includes checking the queue of planned jobs for imminent planned jobs, performing a temporal clamping process for planned jobs scheduled to begin soon, and releasing planned jobs for production. Checking is performed for additional imminent planned jobs and the individual job planner is called to produce a plan for the next job if no imminent planned jobs are identified. A plan is produced for the next job by the individual job planner.

27 Claims, 3 Drawing Sheets

SYSTEM AND METHOD UTILIZING TEMPORAL CONSTRAINTS TO COORDINATE MULTIPLE PLANNING SESSIONS

CROSS REFERENCE TO RELATED APPLICATIONS

The following copending applications, U.S. application Ser. No. 10/855,936, filed May 27, 2004, titled "System and Method for Generative State-Space On-Line Planning", and U.S. application Ser. No. 10/855,938, filed May 27, 2004, titled "Exception Handling in Manufacturing Systems Combining On-Line Planning and Predetermined Rules", are assigned to the same assignee of the present application. The entire disclosures of these copending applications are totally incorporated herein by reference in their entirety.

INCORPORATION BY REFERENCE

The following U.S. patents are fully incorporated herein by reference: U.S. Pat. No. 6,546,300 ("Production/Manufacturing Planning System"); U.S. Pat. No. 6,591,153 ("System and Methods for Scheduling Manufacturing Resources"); U.S. Pat. No. 6,606,527 ("Methods and Systems for Planning Operations in Manufacturing Plants"); and U.S. Pat. No. 6,606,529 ("Complex Scheduling Method and Device").

BACKGROUND

This disclosure relates generally to a method and system for production/manufacturing planning and scheduling. More specifically the disclosure relates to the utilization of temporal constraints to coordinate multiple planning sessions for manufacturing or production operations.

Manufacturing systems conventionally require the planning and scheduling of a series of jobs, with job requests arriving asynchronously over time. Because execution of plans requires the use of physical plant resources, planning for later jobs must take into account the resource commitments in plans already released for production. For example, if part 1 of a job is scheduled to use machine 2 for 15 seconds starting at 4:00:00 pm, the plan for part 2 of that job cannot use machine 2 from 4:00:00 to 4:00:15 pm. While production planning and scheduling may be simple for systems that manufacture many identical jobs in an assembly-line fashion, or factories that produce a very small number of custom jobs over a long period of time, it can be extremely difficult in situations involving high-speed custom made-to-order manufacturing, in which different object may require different processing and the production plan for an object must be created very quickly.

A typical manufacturing plant may be represented as a network of transports linking multiple machines, as shown in FIG. 1. A plant may have anywhere from a few to a several hundred machines and transports. Unfinished blocks of raw material may enter the plant from multiple sources and completed jobs can exit at multiple destinations. In the simplified schematic of FIG. 1, Sources 1 and 2 provide materials to Machine 1 and Machine 2, which interface with Machine 3 and Machine 4 as well as Destinations 1 and 2. Transports between sources, machines, and destinations take a known time to convey jobs. Each machine has a limited number of discrete actions it can perform, each of which has a known duration and transforms its input in a known deterministic way.

From a planning perspective, jobs can move through the plant as illustrated in FIG. 2. A job request specifies a desired final configuration, which may be achievable by several different sequences of actions. For example, in FIG. 2 material may be procured from source S1 to be received and processed by machine M1 utilizing either a first or second operation Act1 or Act2. At the completion of either Act1 or Act2, materials may be sent to destination D1, to machine M3, or to machine M2 for further processing. The plant may operate at high speed, with multiple job requests arriving per second, possibly for many hours. Clearly, an efficient, automated procedure is necessary to coordinate production, with optimization of the throughput of the plan being advantageous.

Further complicating the planning/scheduling process, additional scheduling constraints may be present. In many situations of interest, jobs are grouped into batches. A batch is an ordered set of jobs, all of which must eventually arrive in order at the same destination. Multiple batches may be in production simultaneously, although because jobs from different batches are not allowed to interleave at a single destination, the number of concurrent batches is limited by the number of destinations.

Occasionally a machine or transport will break down, in effect changing the planning domain by removing the related actions. The plant is also intentionally reconfigured periodically. This means that pre-computing a limited set of canonical suboptimal plans and limiting on-line computation to scheduling only is not desirable. For a large plant of 200 machines, there are infeasibly many possible broken configurations to consider. Depending on the capabilities of the machines, the number of possible job requests may also make pre-computation infeasible.

The planner must accept a stream of job specifications that arrive asynchronously over time and produce a plan for each job, with each plan being a sequence of actions labeled with start times. The plant controller executes the plans it is given and reports any failures. Due to communication and processing delays, any plan that is returned by the planner must start later than a certain time past the current instant.

Typically there are many feasible plans for any given job request; the problem is finding one that finishes quickly. The optimal plan for a job depends not only on the job request, but also on the resource commitments present in previously-planned jobs. Existing approaches to this problem require the enumeration of all possible plans at machine start-up, with retrieval of a suitable plan at job request and then scheduling of the necessary actions. However, the large number of potential plans in more complex plants makes an on-line planning system desirable. In such a situation, a method and system is needed for coordinating the planning of individual jobs such that the overall plant throughput can be optimized while respecting the resource commitments of each job and preventing them from overlapping.

BRIEF SUMMARY

The disclosed embodiments provide examples of improved solutions to the problems noted in the above Background discussion and the art cited therein. There is shown in these examples an improved method implemented in a computer control system utilizing temporal constraints to coordinate multiple planning sessions for multi-step production processes such that scheduling constraints are satisfied and flexibility for individual job planning is retained. The computer control system includes an outer planner loop module, which manages the queue of planned and unplanned jobs and interacts with the computer control system, and an individual job planner. The method includes checking the queue of planned jobs for imminent planned jobs, performing a temporal clamping process for planned jobs scheduled to begin soon, and releasing planned jobs for production. Checking is performed for additional imminent planned jobs and the individual job planner is called to produce a plan for the next job if no imminent planned jobs are identified A plan is produced for the next job by the individual job planner.

Also disclosed is a system implemented in a computer control system for utilizing temporal constraints to coordinate multiple planning sessions for multi-step production processes such that scheduling constraints are satisfied and flexibility for individual job planning is retained. The computer control system includes an outer planner loop module, which manages the queue of planned and unplanned jobs and interacts with the computer control system, and an individual job planner. The system includes means for checking the queue of planned jobs for imminent planned jobs, with imminent planned jobs defined as any planned job scheduled to begin soon, with soon defined to be before the time at which the individual job planner will be done planning the next job. A temporal clamping process is applied to planned jobs scheduled to begin soon and jobs are released for production. Checking for additional imminent planned jobs is performed and the individual job planner is called to produce a plan for the next job if no imminent planned jobs are identified. The individual job planner receives job specifications from the outer planner loop, receives a temporal constraint database from the outer planner loop, returns a plan for the next job to the outer planner loop, updates the temporal constraint database, and returns the updated temporal constraint database to the outer planner loop.

Also disclosed is an article of manufacture in the form of a computer usable medium having computer readable program code embodied in the medium which, when the program code is executed by the computer causes the computer to perform method steps for utilizing temporal constraints to coordinate multiple planning sessions for multi-step production processes such that scheduling constraints are satisfied and flexibility for individual job planning is retained, wherein the computer control system includes an outer planner loop module and an individual job planner. The method includes checking the queue of planned jobs for imminent planned jobs, performing a temporal clamping process for planned jobs scheduled to begin soon, and releasing planned jobs for production. Checking is performed for additional imminent planned jobs and the individual job planner is called to produce a plan for the next job if no imminent planned jobs are identified. The individual job planner receives job specifications from the outer planner loop, receives a temporal constraint database from the outer planner loop, returns a plan for the next job to the outer planner loop, updates the temporal constraint database, and returns the updated temporal constraint database to the outer planner loop.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
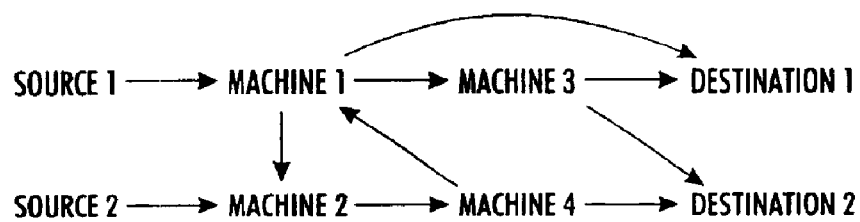
FIG. 1 is a schematic diagram of an example manufacturing plant.
Figure 2:
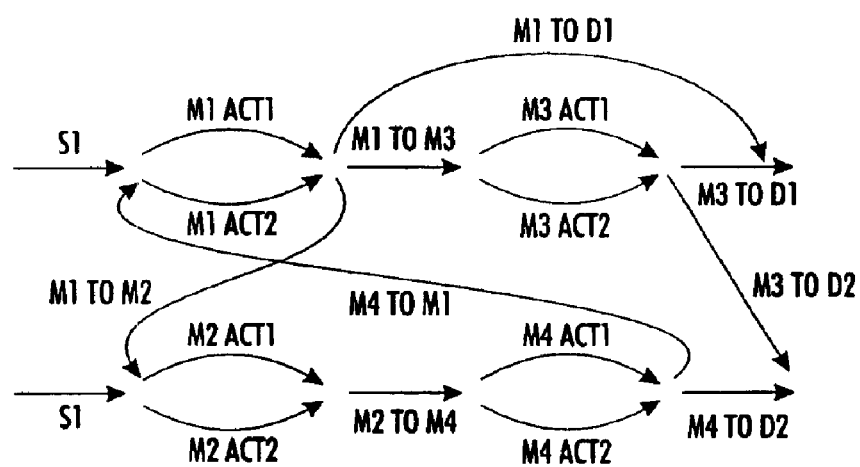
FIG. 2 is a schematic diagram of possible job flow within the manufacturing plant of FIG. 1.

Disclosed herein are a method and system that performs both planning and scheduling functions for controlling production machinery. The method and system perform the task of coordinating the planning of multiple jobs such that scheduling constraints are satisfied while retaining as much flexibility as possible for the planning of individual jobs.

The system and method apply to control software used for multi-step production processes such as manufacturing, printing, or assembly and provide for the handling of complex operations over complex paths to provide flexible routing, optimal productivity, and optimal load balancing. In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the method and system.

Various computing environments may incorporate concurrent planning and scheduling functionality. The following discussion is intended to provide a brief, general description of suitable computing environments in which the concurrent planning and scheduling method and system may be implemented. Although not required, the method and system will be described in the general context of computer-executable instructions, such as program modules, being executed by a networked computer. Generally, program modules include routines, programs, objects, components, data structures, etc. that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like. The method and system may also be practiced in distributed computing environments where tasks are performed by remote processing devices that are linked through a communications network. In a distributed computing environment, program modules may be located in both local and remote memory storage devices.

Although the method and system utilizing temporal constraints to coordinate multiple planning sessions as described herein is not limited to embedded applications, the following discussion will pertain to embedded systems for purposes of example only. One skilled in the art will appreciate that the method and system utilizing temporal constraints to coordinate multiple planning sessions is useful for many complex control problems, generic software solutions to a wide variety of programming problems, flexible programs that separate the model from its solution, and wherever formulation as constraint problems is natural for expression of domain knowledge. Additionally, it may be practiced in a multitude of computing environments.

For the purposes of the discussion herein, it is assumed that jobs are planned one at a time. While various approaches may be used to plan each job, the method maintains as much temporal flexibility as possible in the plans by using a temporal constraint network. In contrast to existing approaches to planning and scheduling in such situations, the present method does not use specific times in the generated plans. Instead of being labeled with the specific actual times that an action should occur, the actions in each plan are labeled with abstract identifiers which, for the purposes herein, are called time points. The system controller maintains a database of these time points, which is augmented by the planning process. Along with each plan (and its associated time points), the planner also returns constraints involving the time points. These temporal constraints specify information about when the time points should occur. For example, in a print system having paper sources and destinations, a temporal constraint may be "feed after time 13" (to allow a previous sheet to feed) or "print side 1 before time 16" (to insert the first side of duplex sheet N before sheet N-1 is printed). The constraints may be relative, such as "print 10 seconds after feeding".

Using this abstract temporal constraint method provides significant advantages to the planning and scheduling process. Because the constraints do not necessarily narrow the possible times for a time point to a single absolute time, the plan for a previously planned job may be shifted in time to make room for a newly planned object if that is advantageous for the overall productivity of the system. Time points are only constrained to specific times just before the plans are released for production.

The overall objective of the planning and scheduling system is to minimize the end time of the last known job. This is approximated by optimally planning only one job at a time instead of reconsidering all unsent plans. Of course, to achieve optimal productivity, it may be necessary to replan previous jobs. However, this is computationally very expensive. The present method and system uses temporal constraints to achieve more flexibility than previous systems and to allow previous jobs to be shifted in time, while still avoiding replanning previous jobs.

Figure 3:
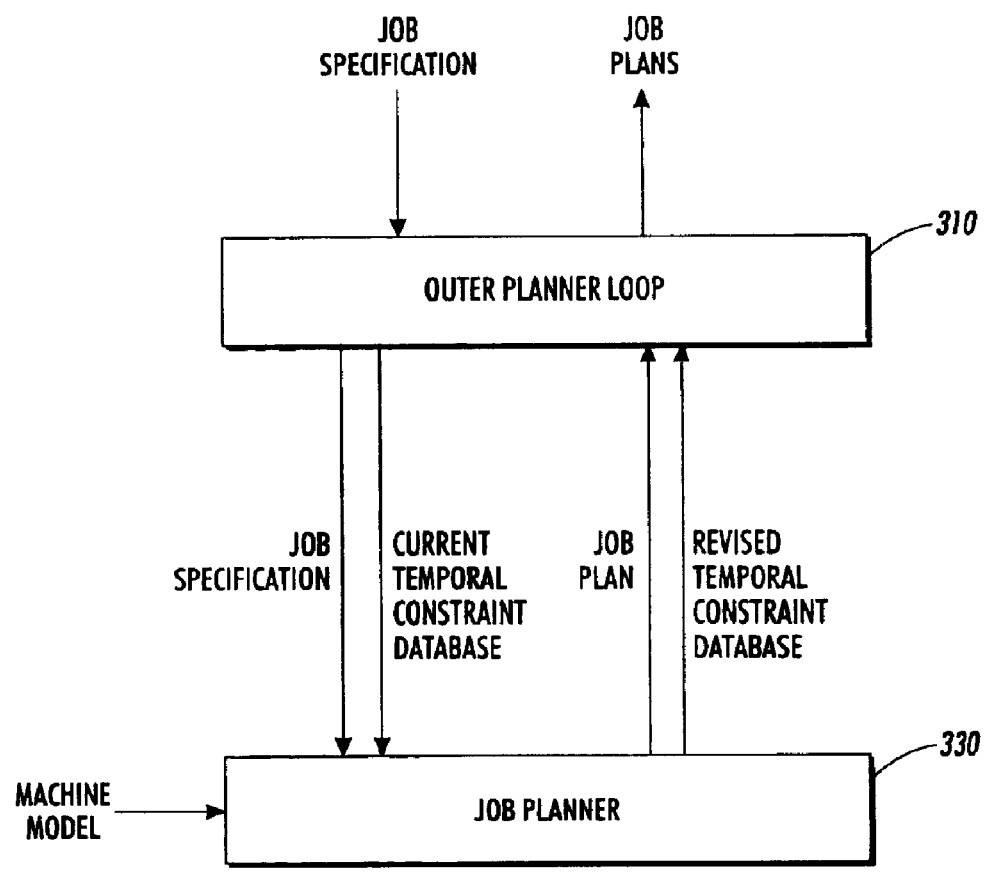
FIG. 3 illustrates an example embodiment of the system for concurrent planning and scheduling.

Turning now to the drawings, wherein the purpose is for illustrating the embodiments of the system and method, and not for limiting the same, FIG. 3 illustrates a diagram of an example embodiment of the method and system utilizing temporal constraints to coordinate multiple planning sessions. Outer planner loop module 310 is responsible for receiving job specifications, calling the individual job planner to produce a plan for each job, and releasing the job plans for production. The job specifications specify the desired objects to be produced. These specifications may come from a user interface, a higher-level system controller, or some other source. They can arrive asynchronously or periodically. Individual job planner 330 receives a job specification and the current temporal constraint database from the outer planner loop 310 and returns the plan for the job and the updated temporal constraint database (incorporating information about the new plan's time points) back to outer planner loop 310.

Figure 4:
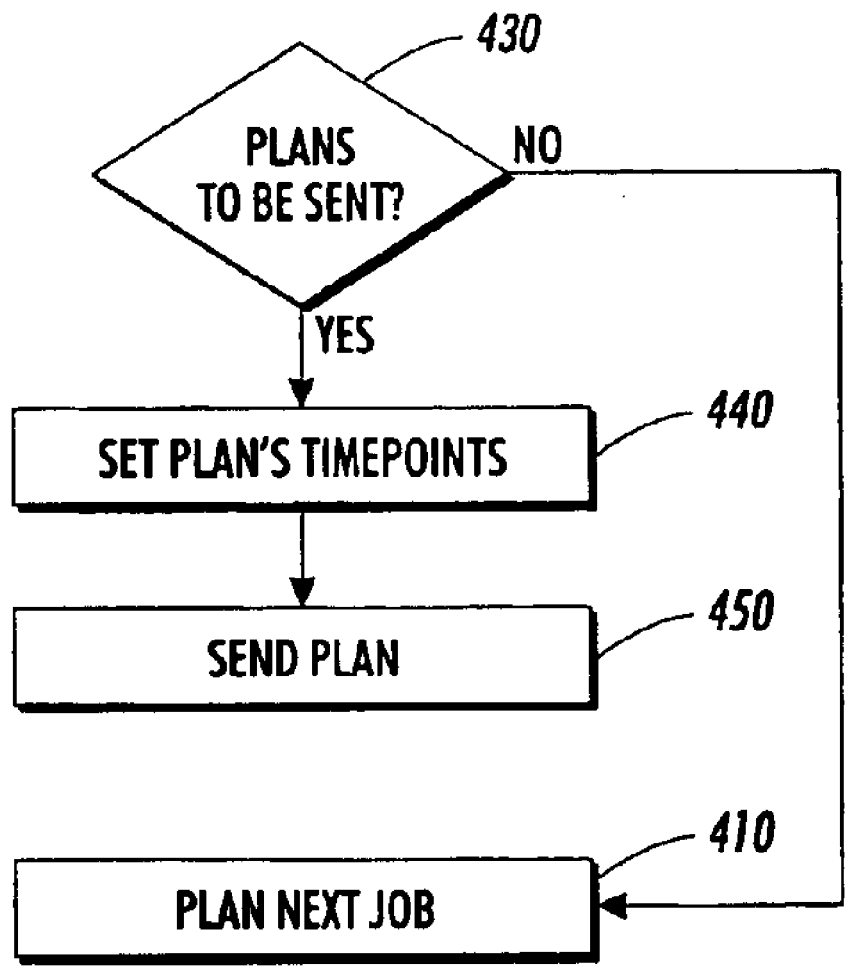
FIG. 4 provides a flow diagram detailing an example embodiment of the flow of operations of the hybrid planner.

Turning now to FIG. 4, a flow diagram details an example embodiment of the flow of operations in the method for coordinating multiple planning sessions. Before invoking the individual job planner to plan a new job, at 430 the outer loop checks its queue of planned jobs to determine if any of them are to begin 'soon', where 'soon' is defined to be before the time at which the individual job planner will be done planning the next job. This can either be some constant amount after the current time or determined by static analysis of the job specification, dynamic analysis of the job specification, or by a heuristic based on the job specification. If the individual job planner takes longer than anticipated, it can be interrupted and restarted at a later time. A plan is said to 'begin soon' if it contains a time point which, given the current temporal constraints, can possibly occur soon. (Recall that the constraints in the temporal database define a feasible time window for each time point, thus the database can be queried for the earliest possible time that a given point can occur.)

If a planned job is scheduled to begin soon, at 440 the allowable intervals of all of the time points in that job are forcibly reduced to specific absolute times, with each time point constrained to occur exactly at the earliest possible time. As discussed below, because a complete algorithm is used to maintain the allowable window for each time point, the propagation caused by this temporal clamping process will not introduce any inconsistencies and the plans are guaranteed to still be valid after the time windows are reduced.

At 450 the plan is then released to the plant and the flow of control returns to 430 to check for additional imminent plans. Note that the outer planner loop only adds additional temporal constraints to the database between calls to the individual job planner. This is because the new constraints may affect feasible job end times and thus might invalidate information that the individual job planner uses to choose between possible plans.

If no planned jobs are identified as beginning soon, the next job is planned at 410. Any of a variety of existing planning methods could be used for planning the individual jobs. The individual job planner could even return a precomputed plan. The only requirement is that the individual job planner must accept the job specification and the current temporal database and return a plan and an updated database such that the plan achieves the job and the constraints in the updated database are consistent with one another.

Central to the method is the temporal constraint database, which may be implemented in several ways. The method disclosed herein only requires that the method used for updating the database be complete. That is to say, the database must be able to detect a possible inconsistency immediately when a new constraint is added. The possible times for each time point must be accurately reported by the database, otherwise it might occur that a previously completed plan that was thought to be feasible could turn out to be infeasible, necessitating replanning of the earlier job. Any of various known procedures may be utilized for updating a temporal constraint database. For example, one such procedure is arc consistency [Cervoni, Roberto, Almedeo Cesta, and Angelo Oddi. 1994. "managing Dynamic temporal Constraint Networks," in *Proceedings of AIPS-94*, 13–18.], in which the database maintains a feasible interval for every time point and updates these intervals according to a simple formula whenever a new constraint is added. Another such procedure is that suggested by Dechter et al [Dechter, Rina, Itay Meiri, and Judea Pearl. 1991. "Temporal Constraint Networks," *Artificial Intelligence* 49:61–95.], in which a full matrix of feasible interpoint relations is stored.

Because the database is used to compute and maintain feasible windows around the time points in a plan until the plan is released to the plant, subsequent plans are allowed to make earlier allocations on the same resources and push actions in earlier plans later. If such an ordering leads to an earlier end time for the newer goal, it will be selected. This provides a way for a complex job that is submitted after a simple job to start its execution in the plant earlier. Out of order starts are allowed as long as the jobs finish in the correct order. This can often provide important productivity gains.

While the present discussion has been illustrated and described with reference to specific embodiments, further modification and improvements will occur to those skilled in the art. For example, besides constraints on time points, the planner/scheduler may also accept any number of objectives that are to be achieved, including not only earliest end time for each job, but also optimal load balancing between resources and optimal reliability of each resource and action. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations, which do not depart from the spirit and scope of the embodiments described herein.

What is claimed:

1. A method implemented in a computer control system for utilizing temporal constraints to coordinate multiple planning sessions for multi-step production processes such that scheduling constraints are satisfied and flexibility for individual job planning is retained, wherein said computer control system includes an outer planner loop module and an individual job planner, and wherein each job resides in a queue in which jobs are marked as being planned or unplanned, the method comprising:

checking the queue of jobs for at least one imminent planned job, wherein said at least one imminent planned job is defined as any at least one planned job scheduled to begin soon, wherein soon is defined to be before a time at which the individual job planner will be done planning the next job, wherein said next job is defined as being an unplanned job to be pulled from the queue of jobs;

performing a temporal clamping process for said planned jobs scheduled to begin soon;

releasing said at least one planned job for production;

checking for additional imminent planned jobs;

calling the individual job planner to produce a plan for said next job if no said imminent planned jobs are identified; and producing a plan for said next job, comprising:

receiving job specifications from the outer planner loop, wherein said job specifications specify desired objects to be produced, and wherein said outer planner loop manages the queue of planned and unplanned jobs and interacts with the computer control system;

receiving temporal constraint database from the outer planner loop, wherein said temporal constraint database includes at least one feasible time window for each time point, wherein said time point includes abstract identifiers for actions;

returning a plan for said next job to the outer planner loop;

updating temporal constraint database, wherein said updated temporal constraint database includes information about the time points of said next job; and returning said updated temporal constraint database to the outer planner loop.

2. The method for utilizing temporal constraints to coordinate multiple planning sessions for multi-step production processes according to claim 1, wherein said job specifications arrive asynchronously.

3. The method for utilizing temporal constraints to coordinate multiple planning sessions for multi-step production processes according to claim 1, wherein said job specifications arrive periodically.

4. The method for utilizing temporal constraints to coordinate multiple planning sessions for multi-step production processes according to claim 1, wherein said time at which the individual job planner will be done planning the next job comprises some constant amount after the current time.

5. The method for utilizing temporal constraints to coordinate multiple planning sessions for multi-step production processes according to claim 1, wherein said time at which the individual job planner will be done planning the next job is determined by static analysis of the job specification.

6. The method for utilizing temporal constraints to coordinate multiple planning sessions for multi-step production processes according to claim 1, wherein said time at which the individual job planner will be done planing the next job is determined by dynamic analysis of the job specification.

7. The method for utilizing temporal constraints to coordinate multiple planning sessions for multi-step production processes according to claim 1, wherein said time at which the individual job planner will be done planning the next job is determined by a heuristic based on the job specification.

8. The method for utilizing temporal constraints to coordinate multiple planning sessions for multi-step production processes according to claim 1, wherein said temporal clamping process comprises forcibly reducing all time points in said planned job to specific absolute times.

9. The method for utilizing temporal constraints to coordinate multiple planning sessions for multi-step production processes according to claim 1, wherein updating said temporal constraint database comprises using arc consistency, wherein said temporal constraint database maintains a feasible interval for every time point and updates these intervals whenever a new constraint is added.

10. The method for utilizing temporal constraints to coordinate multiple planning sessions for multi-step production processes according to claim 1, wherein updating said temporal constraint database comprises storing a full matrix of feasible interpoint relations.

11. The method for utilizing temporal constraints to coordinate multiple planning sessions for multi-step production processes according to claim 1, wherein the multi-step production process comprises a printing system having at least one printer engine.

12. The method for utilizing temporal constraints to coordinate multiple planning sessions for multi-step production processes according to claim 1, wherein the multi-step production process comprises a manufacturing system.

13. The method for utilizing temporal constraints to coordinate multiple planning sessions for multi-step production processes according to claim 1, wherein the multi-step production process comprises an assembly operation.

14. A system implemented in a computer control system for utilizing temporal constraints to coordinate multiple planning sessions for multi-step production processes such that scheduling constraints are satisfied and flexibility for individual job planning is retained, wherein said computer control system includes an outer planner loop module and an individual job planner, and wherein each job resides in a queue in which jobs are marked as being planned or unplanned, the system comprising:

means for checking the queue of jobs for at least one imminent planned job, wherein said at least one imminent planned job is defined as any at least one planned job scheduled to begin soon, wherein soon is defined to be before a time at which the individual job planner will be done planning the next job, wherein said next job is defined as being an unplanned job to be pulled from the queue of jobs;

means for performing a temporal clamping process for said planned jobs scheduled to begin soon;

means for releasing said at least one planned job for production;

means for checking for additional imminent planned jobs;

means for calling the individual job planner to produce a plan for said next job if no said imminent planned jobs are identified; and means for producing a plan for said next job, comprising:
means for receiving job specifications from the outer planner loop, wherein said job specifications specify desired objects to be produced, and wherein said outer planner loop manages the queue of planned and unplanned jobs and interacts with the computer control system;
means for receiving temporal constraint database from the outer planner loop, wherein said temporal constraint database includes at least one feasible time window for each time point, wherein said time point includes abstract identifiers for actions;
means for returning a plan for said next job to the outer planner loop;
means for updating temporal constraint database, wherein said updated temporal constraint database includes information about the time points of said next job; and
means for returning said updated temporal constraint database to the outer planner loop.

15. The system for utilizing temporal constraints to coordinate multiple planning sessions for multi-step production processes according to claim 14, wherein said job specifications arrive asynchronously.

16. The system for utilizing temporal constraints to coordinate multiple planning sessions for multi-step production processes according to claim 14, wherein said job specifications arrive periodically.

17. The system for utilizing temporal constraints to coordinate multiple planning sessions for multi-step production processes according to claim 14, wherein said time at which the individual job planner will be done planning the next job comprises some constant amount after the current time.

18. The system for utilizing temporal constraints to coordinate multiple planning sessions for multi-step production processes according to claim 14, wherein said time at which the individual job planner will be done planning the next job is determined by static analysis of the job specification.

19. The system for utilizing temporal constraints to coordinate multiple planning sessions for multi-step production processes according to claim 14, wherein said time at which the individual job planner will be done planning the next job is determined by dynamic analysis of the job specification.

20. The system for utilizing temporal constraints to coordinate multiple planning sessions for multi-step production processes according to claim 14, wherein said time at which the individual job planner will be done planning the next job is determined by a heuristic based on the job specification.

21. The system for utilizing temporal constraints to coordinate multiple planning sessions for multi-step production processes according to claim 14, wherein said temporal clamping process comprises forcibly reducing all time points in said planned job to specific absolute times.

22. The system for utilizing temporal constraints to coordinate multiple planning sessions for multi-step production processes according to claim 14, wherein updating said temporal constraint database comprises using arc consistency, wherein said temporal constraint database maintains a feasible interval for every time point and updates these intervals whenever a new constraint is added.

23. The system for utilizing temporal constraints to coordinate multiple planning sessions for multi-step production processes according to claim 14, wherein updating said temporal constraint database comprises storing a full matrix of feasible interpoint relations.

24. The system for utilizing temporal constraints to coordinate multiple planning sessions for multi-step production processes according to claim 14, wherein the multi-step production process comprises a printing system having at least one printer engine.

25. The system for utilizing temporal constraints to coordinate multiple planning sessions for multi-step production processes according to claim 14, wherein the multi-step production process comprises a manufacturing process.

26. The system for utilizing temporal constraints to coordinate multiple planning sessions for multi-step production processes according to claim 14, wherein the multi-step production process comprises an assembly operation.

27. An article of manufacture comprising a computer usable medium having computer readable program code embodied in said medium which, when said program code is executed by said computer causes said computer to perform method steps for utilizing temporal constraints to coordinate multiple planning sessions for multi-step production processes such that scheduling constraints are satisfied and flexibility for individual job planning is retained, wherein said computer control system includes an outer planner loop module and an individual job planner, and wherein each job resides in a queue in which jobs are marked as being planned or unplanned, the method comprising:

checking the queue of jobs for at least one imminent planned job, wherein said at least one imminent planned job is defined as any at least one planned job scheduled to begin soon, wherein soon is defined to be before a time at which the individual job planner will be done planning the next job, wherein said next job is defined as being an unplanned job to be pulled from the queue of jobs;

performing a temporal clamping process for said planned jobs scheduled to begin soon;

releasing said at least one planned job for production;

checking for additional imminent planned jobs;

calling the individual job planner to produce a plan for said next job if no said imminent planned jobs are identified; and producing a plan for said next job, comprising:

receiving job specifications from the outer planner loop, wherein said job specifications specify desired objects to be produced, and wherein said outer planner loop manages the queue of planned and unplanned jobs and interacts with the computer control system;

receiving temporal constraint database from the outer planner loop, wherein said temporal constraint database includes at least one feasible time window for each time point, wherein said time point includes abstract identifiers for actions;

returning a plan for said next job to the outer planner loop;

updating temporal constraint database, wherein said updated temporal constraint database includes information about the time points of said next job; and returning said updated temporal constraint database to the outer planner loop.

* * * * *